United States Patent [19]
Bray

[11] Patent Number: 6,158,381
[45] Date of Patent: Dec. 12, 2000

[54] TIME-TEMPERATURE INDICATOR

[75] Inventor: Alan V. Bray, Austin, Tex.

[73] Assignee: Ideas to Market, L.P., Austin, Tex.

[21] Appl. No.: 09/259,107

[22] Filed: Feb. 26, 1999

Related U.S. Application Data

[60] Provisional application No. 60/076,236, Feb. 27, 1998.

[51] Int. Cl.[7] .............................. G01K 1/02; G01K 1/04; G01D 5/02; G01D 11/00
[52] U.S. Cl. ..................... 116/216; 116/201; 116/207; 116/209; 374/102; 374/187; 374/199
[58] Field of Search ................................... 116/201, 207, 116/208, 216, 221; 374/46, 49, 102, 106, 159, 161, 187, 195, 199, 162, 160, 150; 337/410, 411, 413; 426/88

[56] References Cited

U.S. PATENT DOCUMENTS

| | | | |
|---|---|---|---|
| 3,239,634 | 3/1966 | Iiams . | |
| 3,946,611 | 3/1976 | Larsson | 374/106 |
| 4,288,064 | 9/1981 | Austen | 267/182 |
| 5,018,874 | 5/1991 | Girones | 116/216 |
| 5,143,453 | 9/1992 | Girones | 374/106 |
| 5,335,994 | 8/1994 | Girones | 116/221 |
| 5,366,292 | 11/1994 | Voss | 374/188 |
| 5,738,442 | 4/1998 | Paron | 374/162 |

FOREIGN PATENT DOCUMENTS

| | | | |
|---|---|---|---|
| 1011184 | 5/1977 | Canada | 374/160 |
| 368263 | 5/1990 | European Pat. Off. | 374/159 |
| 1344461 | 1/1974 | United Kingdom | 374/159 |
| PCT/US99/ 04358 | 6/1999 | WIPO . | |

OTHER PUBLICATIONS

EPRI NP–1558, "A Review of Equipment Aging Theory and Technology," Final Report Project 890–1, Electric Power Research Institute, 1980.

Arthur D. Little Inc., "Shelf Life Specifications for Mission Readiness; NCEL Contract Report," CR 93.001, Mar. 1993 and CR96.007, Jun, 1996.

Howard E. Boyer, *Atlas of Creep and Stress–Rupture Curves*, ASM International, 1998.

*Primary Examiner*—Diego Gutierrez
*Assistant Examiner*—Faye Francis
*Attorney, Agent, or Firm*—Jenkens & Gilchrist, P.C.

[57] ABSTRACT

A time-temperature indicator indicates the useful shelf life of an associated product which may be affected by the passage of time and an applied temperature. A creeping material has a first end connected to a first fixed location and a second end connected to a load applying device such as a spring. In response to application of the load applying device, the passage of time, and the application of various temperatures, the creeping material will increase in length in a known manner. An indicator associated with the creeping material indicates whether the passage of time and application of various temperatures have caused the associated product to exceed its useful shelf life.

31 Claims, 4 Drawing Sheets

TIME-TEMPERATURE INDICATOR

RELATED APPLICATION

This application claims priority based upon United States Provisional Application No. 60/076,236 filed on Feb. 27, 1998 for "Time Temperature Indicator", said Application being incorporated herein by reference.

BACKGROUND OF THE INVENTION

1. Technical Field of the Invention

The present invention relates generally to the field of deterioration of products and materials as a function of time and temperature, and the determination and indication of the end of a product or material's useful life.

2. Description of Related Art

Manufacturer's stated shelf life estimates are, at best, a gross estimate of the actual state of deterioration of a product or material. The manufacturer of a product or material typically specifies the useful shelf life for predicted worst-case storage conditions. Items undergoing more benign environmental stresses may have true shelf lives up to ten times as long as those stored at worst-case conditions. As an example, paint stored at a temperature of 50° C. (122° F.) has a shelf life of approximately one-third that of paint stored at 30° C. (86° F.) based on the thermal aging constant for typical acrylic paints. The consequential damages of using products or materials such as paints and adhesives after their useful lives have expired can be enormous.

The NCEL study, conducted by Arthur D. Little in March 1993 and updated in 1996 concerning shelf life specifications ("Shelf Life Specifications for Mission Readiness; NCEL Contract Report," CR 93.001, March 1993 and CR 96.007, June 1996.) identified 55 products and materials commonly discarded prematurely because of conservative shelf life estimation by the manufacturer. Of the 55 products and materials, 16 were either plural or single component coatings or adhesives.

Product deterioration can occur as a result of a number of phenomena such as chemical aging, radioactive decay, biological aging, mechanical relaxation, and aerobic interactions which can occur during open-container periods. With the exception of radioactive decay all of these mechanisms have deterioration rates which are dependent upon time and temperature.

SUMMARY OF THE INVENTION

The present invention overcomes the foregoing and other problems with an apparatus for indicating the useful life of an associated product affected by time and temperature. A housing which may be selectively connectable to the associated product or incorporated into the product packaging encloses the major components of the apparatus. A creeping material has a first end connected to a fixed location on the housing and a second end connected to a loading apparatus such as a spring. The spring is likewise connected to another fixed location on the housing.

The creeping material has been calibrated to be responsive to the application of a load provided by the spring and to the passage of time and temperature experienced by the material. As certain time and temperature thresholds are met, the creeping material will increase in length in a known manner. In one embodiment, the creeping material is calibrated to increase in length no more than one inch over the effective shelf life of the associated product.

An indicator associated with the connection between the creeping material and the spring will move along a scale affixed to the housing to indicate when the associated product has exceeded its effective shelf life. The indicator and scale may be electronically scannable to enable a database on the associated product to be maintained. Using this apparatus, producers of products may attach the time temperature indicator to their packaging, enabling consumers and sellers of the products to easily determine when the passage of time at subjected temperatures have rendered the associated product unusable.

BRIEF DESCRIPTION OF THE DRAWINGS

The following drawings form part of the present invention and are included to further demonstrate certain aspects of the present invention. The invention may be better understood by reference to one or more of these drawings in combination with the detailed description of specific embodiments presented herein.

DETAILED DESCRIPTION OF THE DRAWINGS

A preliminary study was performed to demonstrate the underlying technological concept of such time-temperature indicators (TTI). Milk was selected as the time-temperature dependent product since it sours in a matter of days at room temperature and souring (or chemical aging), which is the deterioration mechanism, is easily detected by smell or by a pH change from 6 to 4 at the end of its useful shelf life. A TTI to match the predicted shelf life time frame was designed using a spring and creeping material combination and a drafting ruler as a frame. This combination retains all the aging properties of a production TTI. The creeping material used was a lead-tin alloy solder, which, because of its high lead content, creeps significantly under small loads at room temperature.

Four milk cartons with the same expiration date were paired with four TTI's and placed in different environments:

1. SAMPLE 1 was placed in an oven and held at 33° C. The milk soured in one day. The TTI reading was 0.24 inches.

2. SAMPLE 2 was held at room temperature (approximately 22° C.). The milk soured in three days. The TTI reading was again 0.24 inches.

3. SAMPLE 3 was held at room temperature (22° C.) for 2 days, then moved to a typical household refrigerator (5° C.). The milk soured in 9 days with a TTI reading of 0.21 inches.

4. SAMPLE 4 was placed in a typical household refrigerator and held at 5° C. for the duration of the study. The milk soured in 13 days with a TTI reading of 0.17 inches, corrected to 0.21 inches for spring contraction due to temperature.

Figure 1:
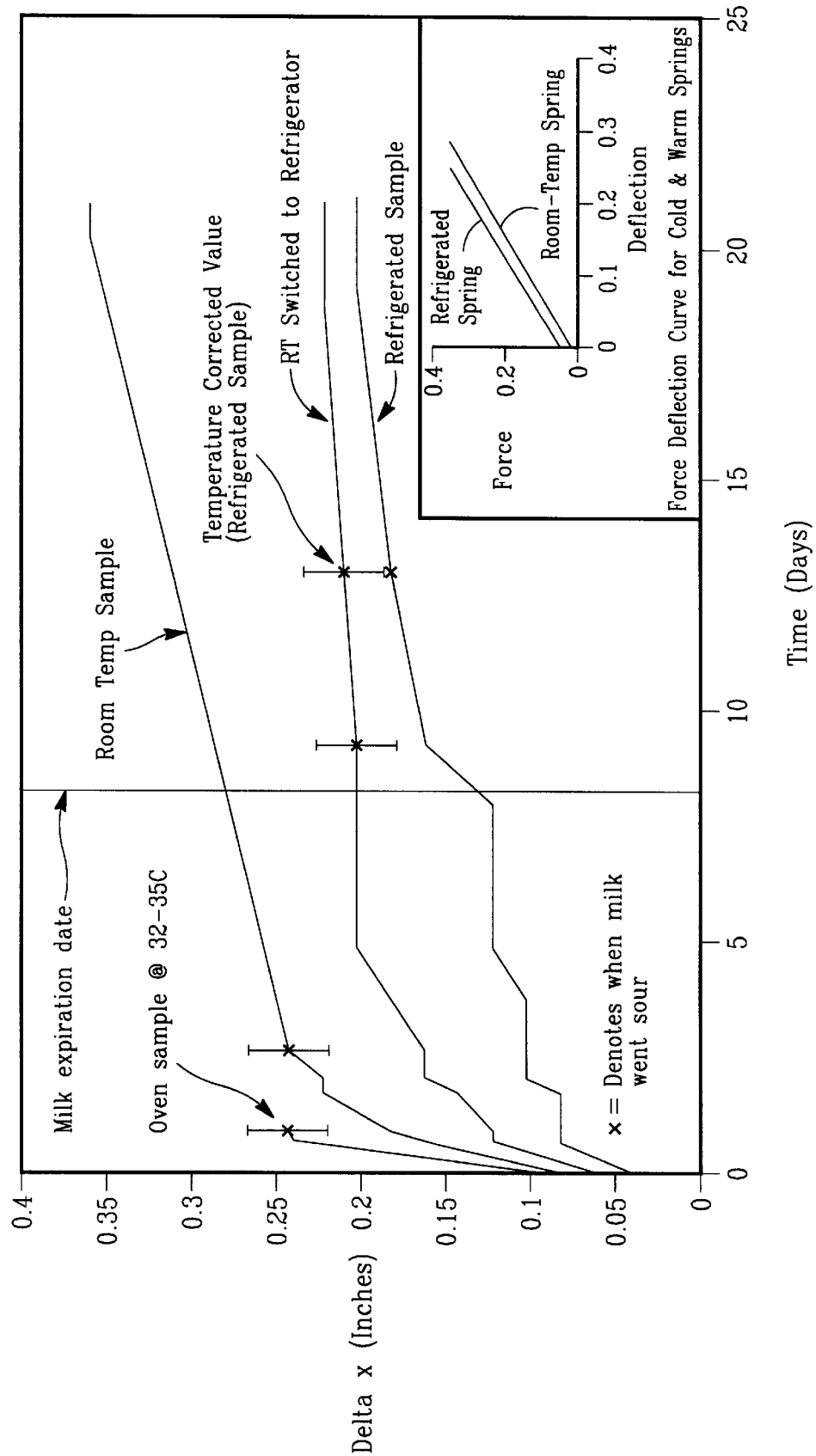
FIG. 1 shows the results of the preliminary study using milk as the "product" and solder as the "creeping material" in the time-temperature indicator (TTI)

These results of this study are graphically depicted in FIG. 1.

The Sample 4 TTI reading was corrected by measuring the spring response cold and at room temperature, see inset in FIG. 1, and correcting the data for the difference in load at a given reading. This problem can be averted by selecting a temperature resistant spring material such as Ni-Span-C or Invar or by altering the calibration procedure.

The basic concept of this TTI is that the extension of the creeping (relaxing) material is consistent, or predictably related, regardless of environment, at the end of a product's useful shelf life. This thesis holds true if the creeping material and the spring are selected in a manner to avoid asymptotic limits on the motion of the TTI. The selection of both the creeping material and spring must also be specific to the product in order to set the indicator for the end of that product's useful shelf life. The preliminary study demonstrated this predicted result. The subject technology is based upon a new material aging characteristic which is time and temperature dependent. The material aging characteristic is a property known as creep or stress relaxation of a material under load. Creep is defined as the slow deformation of a material under a stress that results in a change in shape.

Any material that exhibits creep under the desired temperature range may be used as a creeping material. Table 1 lists materials that may be used as a creeping material in the present invention. Table 2a lists examples of types of springs that may be employed in the present invention. Table 2b lists representative materials that may be used as a spring. While these materials and spring types are examples and preferred embodiments of the present invention, it is apparent that many changes, modifications and variations in the materials and arrangement of components can be made without departing from the inventive concept disclosed herein. Accordingly, the spirit and broad scope of this patent application is intended to embrace all such changes, modifications and variations that may occur to one of skill in the art upon learning of this disclosure.

TABLE 1

List of Possible Creeping Materials for use in a TTI

The following elements or Amalgamations of: alloys of:

| | |
|---|---|
| Copper | Mercury |
| Tin | |
| Lead | Polymeric Materials |
| Indium | Elastomeric Materials |
| Thallium | |
| Gold | Other materials and alloys with relatively high rates |
| Silver | of creep |
| Aluminum | |

TABLE 2a

Types of Springs for Possible Use in a TTI

| | |
|---|---|
| Helical Tension | Leaf |
| Helical Torsion | Flat |
| Spiral | Torsion Bar |
| Belleville | Grouped or Nested |
| Volute | Conical |

TABLE 2b

List of Possible Spring Materials for use in a TTI

| DESIGNATION | SPECIAL USES/PROPERTIES |
|---|---|
| Hard-Drawn Spring Wire | Cold-drawn, cold wound helical spring |
| Music Wire | Cold-drawn, cold wound helical spring |

TABLE 2b-continued

List of Possible Spring Materials for use in a TTI

| DESIGNATION | SPECIAL USES/PROPERTIES |
|---|---|
| Oil-Tempered Wire, A | Hardened and tempered cold wound helical spring |
| Oil Tempered Wire, B | Hardened and tempered cold wound helical spring |
| Carbon-Steel, valve spring quality | Hardened and tempered cold wound helical spring |
| Cr—V steel; spring wire | Cold-drawn, cold wound helical spring |
| Cr—V steel; valve spring quality | Hard-drawn or hardened and tempered |
| Type 302 stainless-steel spring wire | Cold-drawn, cold wound helical spring |
| Cr—Si steel spring wire (SAE 9254) | Hard-drawn or hardened and tempered |
| Carbon Steel, SAE 1085 | Hot-coiled and flat springs |
| Carbon Steel, SAE 1095 | Hot-coiled and flat springs |
| Alloy Steel, SAW 4068 | Hot-coiled springs |
| Spring Brass | Low stress, low cost |
| Nickel Silver, ASTM B206-54 | Low stress, low cost |
| Nickel Silver, ASTM B122-55T | Low stress, low cost |
| Phosphor Bronze, ASTM B159-54 | For higher stresses than brass |
| Phosphor Bronze, ASTM B103-55 | For higher stresses than brass |
| Silicon Bronze | Similar to phosphor bronze, less costly |
| Beryllium copper, ASTM B197-52 | Corrosion resistant, good mechanical properties |
| Beryllium copper, ASTM B196-52 | Corrosion resistant, good mechanical properties |
| Beryllium copper, ASTM B194-52 | Corrosion resistant, good mechanical properties |
| Monel | Corrosion resistant, good mechanical properties |
| K Monel | Corrosion resistant, good mechanical properties |
| Permanickel | Higher stresses |
| Inconel | Higher stresses |
| Inconel X | Higher stresses |
| Ni-Span-C | Zero temperature coefficient of modulus - 50 F. to 150 F. |
| Invar | Zero temperature coefficient of modulus in range of interest |
| Natural rubber | High energy storage per unit volume |
| Synthetic rubber | High energy storage per unit volume |
| Polymeric Materials | High energy storage per unit volume, low cost |
| Elastomeric Materials | High energy storage per unit volume, low cost |

In practice, the TTI is calibrated to reflect the shelf life of the material or product it is sensing. Calibration of the prototype TTI could have been performed using the extension of the highest temperature sample, Sample 1. This value, in preferred embodiments, is less one standard deviation or similar statistical estimate, and would have been set as the threshold for the other three samples. As the TTI's on Samples 2, 3 and 4 reached the threshold set by Sample 1, these samples would be pulled for destruction. In this study, had the TTI output been used in lieu of the expiration date on the carton of Sample 4, a total of 6 days of additional milk usage would have been indicated.

The following represents how an embodiment in which a TTI for a specific product or material could be designed, calibrated and fabricated:

1. Physical properties testing—to determine the end of shelf life state of the product, such as a paint reaching a critical viscosity or a reaction failure of an epoxy.

2. Thermal analysis—to determine the thermal aging constants (activation energy) of the product.

3. Sensor design model—to estimate the range of the TTI and to provide calibration data for setting the end of shelf life point for the specific product.

4. High temperature exposure—provides an empirical measure of the extension of the TTI at a given level of deterioration. Temperature and time of testing are determined from thermal analysis results.

5. Sensor calibration—calibration of the TTI is based on the design model results and the high temperature exposure data.

6. Sensor fabrication—sensors are fabricated to the calibration setting, hermetically sealed, and shipped to the manufacturer for installation at or near production.

Figure 2:
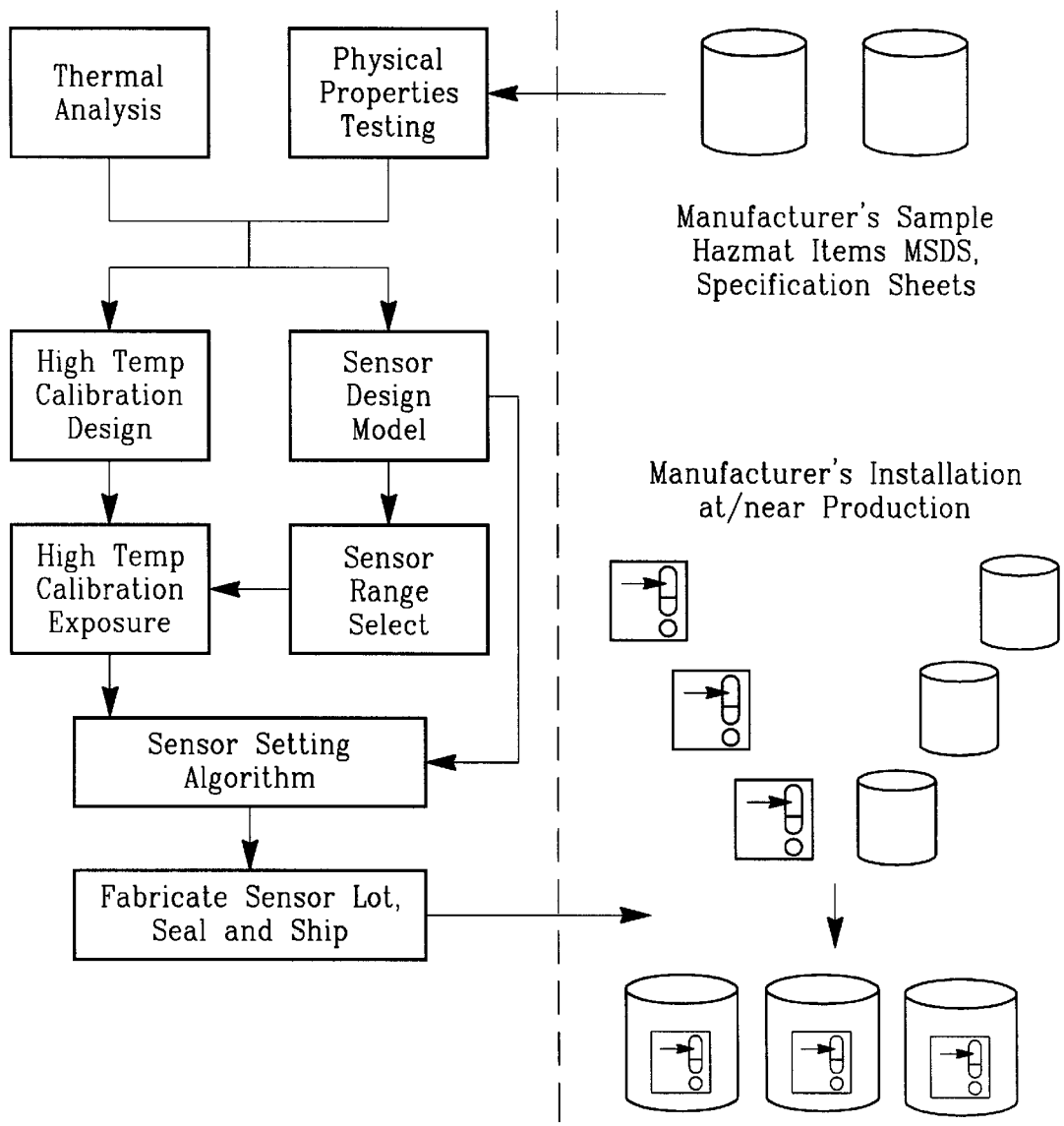
FIG. 2 shows the overall TTI concept.

FIG. 2 is a schematic depiction of the way in which the TTI concept is implemented. In the field, sensors will be periodically checked and the product discarded when the TTI reaches the calibration value printed on the frame indicating end of shelf life. Some versions of the sensor will contain a temperature sensitive liquid crystal 10 (FIG. 4) or some other type of temperature sensitive display to indicate whether a critical temperature has been reached in the life of the product. As an example, most paints have a storage restriction against exposure to freezing temperatures to avoid emulsification problems. By adding a temperature limit sensor to the TTI, both aging and incorrect temperature exposure are available in a single unpowered sensor.

Initially, it is necessary to analyze the mechanical system of the TTI and solve for net relaxation rate of the creep material at a fixed temperature. Since a spring or other loading apparatus is being used as the source of the load, the force exerted on the creeping material changes with time, decreasing as the spring contracts. The creeping material is never actually in pure creep, which by definition occurs at constant load. The creeping material may comprise a rectangular strip, filament, film or any other type of configuration.

Figure 3:
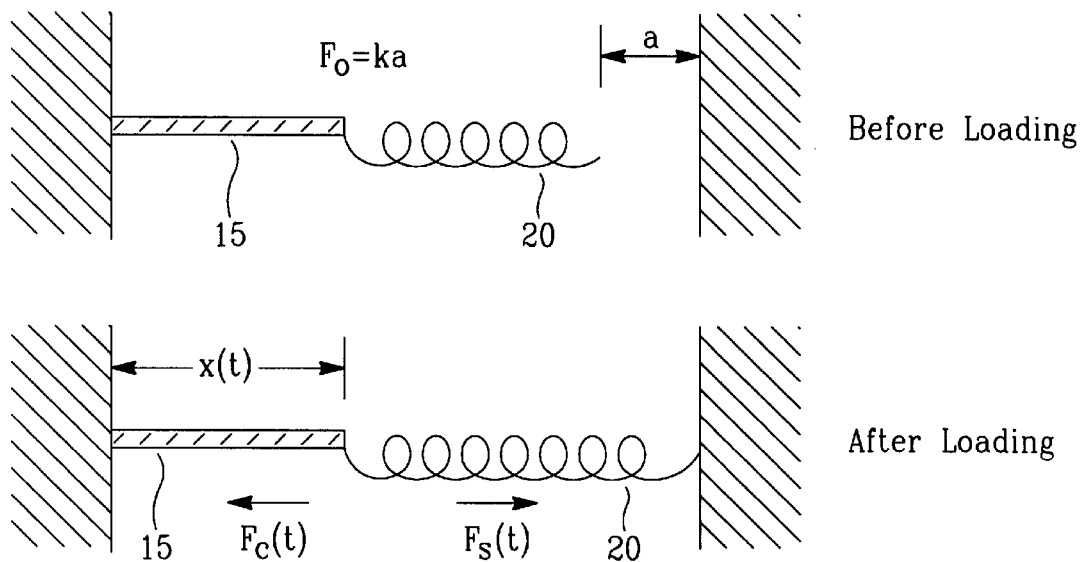
FIG. 3 shows the forces acting in the TTI.
Figure 4A:
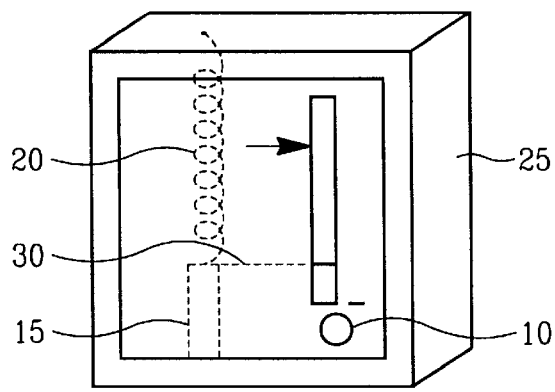
FIGS. 4a–4e show the TTI concept and individual components.
Figure 4B:
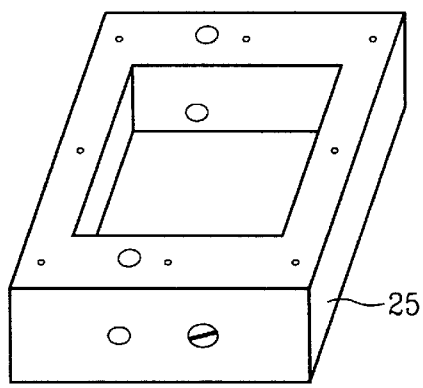
Figure 4C:
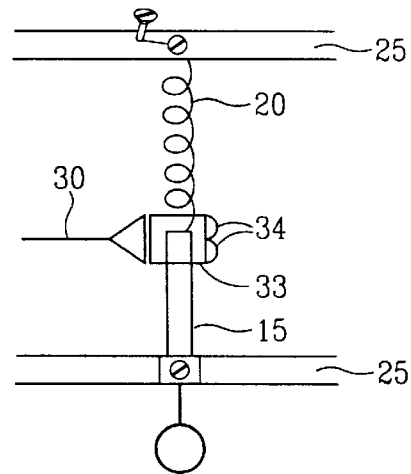
Figure 4D:
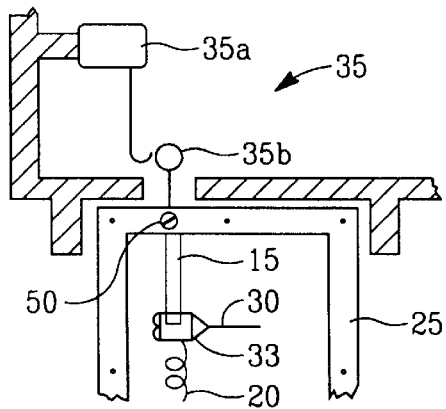
Figure 4E:
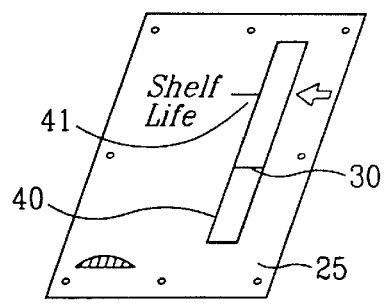

FIG. 3 is a schematic of the TTI and the forces acting on it. Thus, the net tension in the spring line is:

$$F(t) = F_O - F_S(t) + F_C(t) \tag{1}$$

where $F_O$ is the initial tension at loading, $F_S$ is the spring restoring force, and $F_C$ is the compliance/resistance force of the material opposing spring restoration. Initially, the net force in the system is $k_a$, where k is the spring constant and a is the amount of movement to cock the system, since during cocking there is essentially no relaxation of the material. After cocking, the material begins to relax under load as the spring retracts. To this equation must be added the effect of temperature on spring and creeping material dimensions. This equation will be solved for the first derivative of extension, dx(t)/dt, the rate of travel of the TTI needle/indicator 30 (FIG. 4).

The essential element of this TTI concept is the rate of creep of the creeping material 15 selected for a given product. Creep (relaxation) rates depend upon temperature through an Arrhenius relationship, $$dx(t)/dt = A \exp(E/RT) \tag{2}$$

where E is the activation energy for relaxation of the material, R is Boltzmann's constant, and T is the temperature in degrees Kelvin. The net extension over a time roughly equal to the shelf life at a given temperature will be calculated using Arrhenius acceleration factors.

A well designed TTI should have an extension of approximately one inch during the useful life of the product to insure good readability of the indicator. The extension could also be calibrated to be any constant amount that could be monitored and amplified to provide a visual representation of when the shelf life of a product had been reached. The design model will allow spring 20 and creeping material 15 selection tradeoffs to be made to achieve the one inch extension goal for production TTIs. In the preliminary study, the TTIs had four solder lines and only a ¼ inch extension at shelf life, making them difficult to read accurately. Reduction to 2 lines of solder would have achieved roughly a ½ inch extension at souring, but also run a higher risk that the spring would completely relax (i.e., the solder would creep so much that the spring would return to its initial length and stop exerting a load on the solder) before end of shelf life. This is one of the asymptotic limits to be avoided in this TTI design.

Another potential asymptotic limit to avoid is when the creeping material cannot reach the calibration extension because of low creep rates at low temperature. There is a time temperature history range over which a given spring and creep material will be able to capture product shelf life under almost all storage conditions, but selection of the spring, creep material, and tension is critical to accurate sensing of product deterioration.

The design model will allow spring restoring force, material relaxation properties, and tension to vary to roughly match the intended product shelf life and anticipated storage temperature exposure range. In practice, there may have to be a number of versions of the TTI to cover a wide range of shelf lives (e.g., 0.5 to 1.5 years, 1 to 3 years, 2 to 5 years) based on standard storage temperature profiles. After selecting the gross sensor range, the TTI will then be calibrated specifically to the product it is to be placed upon. Mechanically, this is done by setting the tension in the loading apparatus or by setting the end of life mark along the scale on the cover, or some combination of both.

FIGS. 4a–4e illustrate one option for the final version of this TTI. It is one goal of the present invention to provide commercial TTIs that perform reliably for extended periods. A frame 25 constructed of a frame material stiff enough to remain unaffected by the tension in the loading apparatus/spring 20. If the frame 25 were to relax or bend, the tension in the loading apparatus/spring 20 would be reduced and the product could be interpreted as "younger" than it actually is. A hermetically sealed frame 25 may be desirable to eliminate moisture from affecting the spring 20 and creeping material 15. The frame 25 may be removably attachable to a product, or alternatively, may be incorporated into the packaging of the product.

The connection of the spring 20 to the frame 25 and to the creeping material 15, as well as the pointer 30, should be long lived and sturdy. The connection between the spring 20, creeping material 15 and pointer 30 may utilize a combination connection sleeve and pointer 33. This device would include the pointer 30 extending from a sleeve 33 which receives the spring 20 and creeping material 15. The spring 20 and creeping material 15 are held in place in the sleeve via a pair of set screws 34.

The frame/housing 25 further includes a scale 40 including a point 41 indicating that the maximum useful shelf life period of the product has been reached. The pointer 30 connected near the connection between the spring 20 and creeping material 15 points to a position on a scale 40 for indicating when the useful shelf life of the product has been reached. The pointer 30 and scale 40 may include coatings or indicators which are readable by an electronic scanning device. For example, a bar code scaling system might be utilized to enable optical scanning equipment to electronically record the product's remaining useful shelf life and store this information in a data base.

The frame/housing 25 also encloses a temperature sensor indicator 10 such as a liquid crystal temperature indicator that indicates applications of certain critical temperatures to a product.

A cocking mechanism 35 consists of a pneumatic cocking mechanism 35a and a cocking eyelet 35b that is attached to either the creeping material 15 or spring 20. The description with respect to the FIG. 4 illustrates the cocking eyelet 35b being connected to the creeping material 15. The pneumatic cocking mechanism 35a will apply a tension to the creeping material 15 and spring 20, and the tensioned creeping material and spring are set at a bias position by tightening a set screw 50. The spring 20 and creeping material 15 are biased to such a point that the asymptotic limit with respect to relaxation of the spring 20 discussed previously should not be reached for the associated product on which the time-temperature indicator will be placed. The cocking mechanism 35 may be removable for safety, sealing and stacking considerations. In certain embodiments, the TTIs would be cocked and sealed before being sent to the manufacturer, the setting determined by a calibration process which analyzes and pretests the product.

EXAMPLE I
Coatings or Paints

The technology of the present invention may be used to provide an indication of the remaining useful life of a product such as a coating or paint. The primary industry criteria for single and plural component coatings shelf life is an increase in viscosity, usually observed as premature polymerization, associated with time/temperature exposure. Other deterioration mechanisms can include: alteration of pigments, degradation of additives, as well as deterioration of the resin. For example, in designing and calibrating a production TTI for acrylic paint, the paint viscosity, after elevated temperature exposure, will be measured using a rotary viscometer and compared with baseline measurements. This analysis will yield both the critical state for end of shelf life and the activation energy associated with achieving this state. In one embodiment of the invention, the TTI will be designed to indicate no remaining useful life when this critical viscosity is attained. In other embodiments, the TTI will indicate how much time has elapsed since the product or material's shelf life has expired.

The use of such an indicator will prevent the premature discard of products and materials such as paints and prevent its use after the product's useful life has expired, thereby preventing possibly severe consequences in the event of failure. The use of the present invention may result in lower consumer costs and a reduction of the disposal of products and materials with remaining useful lives.

EXAMPLE II
Adhesives

The technology of the present invention may be used to provide an indication of the remaining useful life of a product such as an adhesive. The primary industry criteria for single component adhesive shelf life is an increase in viscosity associated with time/temperature exposure. In designing and calibrating a production TTI for a typical single component adhesive, the viscosity, after elevated temperature exposure, will be monitored and compared with baseline measurements. This analysis will yield both the critical state for end of shelf life and the activation energy associated with achieving this state. In some embodiments, the TTI will be designed to indicate no remaining useful life when this critical viscosity is attained.

The use of such an indicator will prevent the premature discard of products and materials such as adhesives and prevent its use after the product's useful life has expired, thereby preventing possibly severe consequences in the event of failure. The use of the present invention may result in lower consumer costs and reduction of the disposal of products and materials with remaining useful lives.

EXAMPLE III
Pharmaceuticals and Medical Products

The technology of the present invention may be used to provide an indication of the remaining useful life of pharmaceuticals and medical products. Many pharmaceuticals and medical products must be maintained at extremely low temperatures until utilized in order to maintain their efficacy. One current means of evaluating the temperature history of medical products that require low temperature storage conditions, on-site as well as during shipping, is to examine the form of the dry ice ($CO_2$) packed with the product. If the dry ice appears to have sublimated and refrozen, the dry ice will appear as a sheet instead of its original cube shape, thus indicating an unacceptable temperature history and cause for rejection by the intended end-user.

The use of such an indicator will prevent the unnecessary discard of products and materials with remaining useful shelf lives, as well as preventing their use in the event of improperly controlled temperature, which could result in undesirable consequences. The use of the present invention may result in lower consumer costs and may reduce the disposal of products and materials with remaining useful lives.

EXAMPLE IV
Any Product or Material Whose Useful Life is Dependent Upon Time and Temperature Exposure The technology of the present invention may be used to provide an indication of the remaining useful life of any product or material whose useful life is dependent upon time and temperature exposure. Certain products may have shelf lives of as little as one-third that of the same product stored at ambient conditions 20° C. lower. The consequential damages of using certain products or materials after their useful lives have expired can be enormous and the premature discard of these products is a waste of resources.

The use of such an indicator will prevent the unnecessary discard of products and materials with remaining useful shelf lives, as well as preventing use which could result in undesirable consequences. Examples of products and materials that could benefit from the use of the present invention (in addition to those identified in the above examples) include, but are not limited to: photographic film, radiographic film, food products, dairy products, soft drinks, beer, wine and batteries. The use of the present invention may result in lower consumer costs and reduction of the disposal of products and materials with remaining useful lives.

Although one embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions.

What is claimed is:

1. An apparatus for indicating a useful shelf-life of an associated product affected by time and temperature, comprising:

a creeping material having a first end connected to a first fixed location, said creeping material increasing in length by a predetermined amount in response to application of a load, a passage of time and an applied temperature; and a loading device connected to a second end of the creeping material for applying the load to the creeping material, and a scale which indicates remaining useful life of the product in response to said increase in length by said predetermined amount of said creeping material.

2. The apparatus of claim 1, wherein the loading means comprises a spring having a first end connected to the second end of the creeping material and a second end connected to a second fixed location.

3. The apparatus of claim 2, wherein the spring comprises at least one of a helical tension spring, a helical torsion spring, a spiral spring, a belleville spring, a volute spring, a leaf spring, a flat spring, a torsion bar spring, a group spring, a nested spring and a conical spring.

4. The apparatus of claim 1, further including a housing enclosing the creeping material and the loading means and providing the first fixed location.

5. The apparatus of claim 4, wherein the housing is selectively connectable to the associated product.

6. The apparatus of claim 1, further including a sensor for indicating if the creeping material has been exposed to a selected temperature.

7. The apparatus of claim 1, further including:

a scale providing a visual indication of a point at which the associated product has reached its useful shelf life; and a pointer connected substantially near the second end of the creeping material for pointing to a location on the scale.

8. The apparatus of claim 1, further including means for setting the loading device to a beginning bias point.

9. The apparatus of claim 1, wherein the loading device is biased such that the load extends the creeping material to a selected point after passage of a selected time period.

10. The apparatus of claim 1, wherein the creeping material is calibrated to increase in length approximately one inch during a selected period of time.

11. The apparatus of claim 1, wherein the creeping material is calibrated to increase in length in a constant manner.

12. The apparatus of claim 1, wherein the creeping material comprises at least one of the elements or alloys of copper, tin, lead, indium, thallium, aluminum, gold, and silver.

13. The apparatus of claim 1, wherein the creeping material comprises at least one of amalgamations of mercury, polymeric materials, or elastomeric materials.

14. An apparatus for indicating a useful shelf life of an associated product affected by time and temperature, comprising:

a housing for enclosing the apparatus;

a creeping material having a first end connected to a first fixed location on the housing, the creeping material increasing in length by a predetermined amount responsive to an application of a load, a passage of time and a temperature to which the creeping material is exposed; and a spring having a first end connected to a second end of the creeping material and a second end connected to a second fixed location on the housing for applying the load to the creeping material, and a scale which indicates remaining useful life of the product in response to said increase in length by said predetermined amount of said creeping material.

15. The apparatus of claim 14, wherein the housing is selectively connectable to the associated product.

16. The apparatus of claim 14, wherein the housing comprises at least a portion of a packaging of the associated product.

17. The apparatus of claim 14, further including a temperature sensitive liquid crystal for indication if the creeping material has been exposed to a selected temperature.

18. The apparatus of claim 14, further including:

a scale providing a visual indication of a point at which the associated product has reached its useful shelf life; and a pointer connected substantially near the second end of the creeping material for pointing to a location on the scale.

19. The apparatus of claim 18, wherein the scale further comprises a scale scannable by a scanning apparatus.

20. The apparatus of claim 19, wherein the indicator further comprises an indicator scannable by the scanning apparatus.

21. The apparatus of claim 14, further including means for setting the loading means to a beginning bias point.

22. The apparatus of claim 14, wherein the creeping material is calibrated to increase in length of approximately one inch during a useful life of the associated product.

23. The apparatus of claim 14, wherein the creeping material comprises at least one of the elements or alloys of copper, tin, lead, indium, thallium, aluminum, gold, silver.

24. The apparatus of claim 14, wherein the creeping material comprises at least one of amalgamations of mercury, polymeric materials, or elastomeric materials.

25. The apparatus of claim 14, wherein the spring comprises at least one of a helical tension spring, a helical torsion spring, a spiral spring, a belleville spring, a volute spring, a leaf spring, a flat spring, a torsion bar spring, a group spring, a nested spring and a conical spring.

26. The apparatus of claim 14, wherein the creeping material comprises a rectangular strip.

27. The apparatus of claim 14, wherein the creeping material comprises a filament.

28. The apparatus of claim 14 wherein the creeping material comprises a film.

29. A method for determining the remaining useful life of a product, comprising the steps of:

applying a force to a creep material which increases in length in a known manner in response to the force, a passage of time, and applied temperatures; and indicating an amount by which the creep material has increased in length on a scale indicating a useful life of the product.

30. The method of claim 29, further including the step of biasing a force applying means to provide a predetermined initial force to the creep material.

31. The method of claim 29, wherein the step of indicating further comprises the step of:

pointing to a scale, using a pointer fixed to the creep material, indicating a point at which the useful life of the product has passed.

* * * * *